United States Patent [19]

McCabe

[11] Patent Number: 5,076,326
[45] Date of Patent: Dec. 31, 1991

[54] ELECTROMAGNETICALLY OPERATED FLUID CONTROL VALVE

[75] Inventor: Ralph P. McCabe, Troy, Mich.

[73] Assignee: Coltec Industries Inc., New York, N.Y.

[21] Appl. No.: 597,453

[22] Filed: Oct. 15, 1990

[51] Int. Cl.⁵ ............................................ F15B 13/044
[52] U.S. Cl. .............................. 137/625.65; 251/284; 335/257
[58] Field of Search .................... 137/625.65; 335/257; 251/284

[56] References Cited

U.S. PATENT DOCUMENTS

| | | | |
|---|---|---|---|
| 3,285,285 | 11/1966 | Bielefeld | 137/625.65 |
| 4,917,150 | 4/1990 | Koch et al. | 137/625.65 |
| 4,944,331 | 7/1990 | Tackett | 137/625.65 |
| 4,987,923 | 1/1991 | Tackett | 137/625.65 |

*Primary Examiner*—Gerald A. Michalsky
*Attorney, Agent, or Firm*—Howard S. Reiter

[57] ABSTRACT

A magnetically operated pressure control valve includes an electromagnetic coil having a central passage extending axially through the coil. A moveable armature is axially disposed in the coil passage to be magnetically attracted to a pole piece when the coil is energized. An armature spring biases the armature in a first position when the coil is not energized. A valve body is stationarily located in the valve housing and has two conduits therein. Movement of the armature controls fluid flow in the two conduits to control fluid flow between a supply port and a control port, and the control port and an exhaust port. Wave washer springs are located at opposite ends of the armature between the armature and the valve housing to resiliently absorb kinetic energy from movement of the armature, to reduce impact stress between the armature and housing, and to prevent a vacuum lock between the armature and housing due to their flat surfaces and the fluid in the valve.

16 Claims, 2 Drawing Sheets

ELECTROMAGNETICALLY OPERATED FLUID CONTROL VALVE

BACKGROUND OF THE INVENTION

1. Field of the Invention

The present invention relates to solenoid or electromagnetically operated fluid control valves employed in applications where the valve will accurately vary fluid pressure at a control port in accordance with variations in an electrical control signal, which may be derived from a computer and sensor, which can vary the on-off time of energization of the solenoid.

2. Prior Art

While there are many applications for such a valve, one application which has been of interest in recent years is that of the control of an automatic transmission for a motor vehicle by independently regulating the engagement pressure applied to each of the various clutches in the transmission. The torque transmitted by a given clutch may be varied by varying the pressure of engagement between the opposed clutch plates. Presently available electronic control units can rapidly and precisely generate the desired electrical output signals in response to sensed vehicle operating conditions. One such valve is described in copending U.S. patent application Ser. No. 07/471,709, filed Jan. 29, 1990 now U.S. Pat. No. 4,998,559, entitled "Solenoid Operated Pressure Control Valve" assigned to the same assignee as herein which is incorporated by reference in its entirety hereby.

However, converting these electrical control signals into a precisely proportional fluid pressure which will accurately track variations in the electrical control signal has posed problems.

In such a system, a solenoid actuated valve is a logical choice as the interface between the electrical and hydraulic portions of the system. See, for example, U.S. Pat. No. 4,579,145 which describes a solenoid actuated valve for such an application. A system employing a valve of the type shown in that patent is described in some detail in SAE Technical Paper 840448.

As in U.S. Pat. No. 4,579,145, a solenoid actuated valve may be designed to regulate the pressure at a control port by cyclically connecting the control port alternately to a source of fluid under pressure and to a fluid sump, these alternate connections being made in accordance with the energization or deenergization of the solenoid coil. An electronic processor may be employed to regulate the time during each cycle the coil is energized ("on time"), the coil being deenergized for the remainder of the cycle ("off time"). This type of regulation is commonly referred to as pulse width modulation. A typical operating pulse frequency might be 60 Hz. In steady state operation the pressure at the control port will be that percentage of the fluid source pressure which is equal to that percentage of time which the control port is connected to the fluid source, sump pressure being assumed to be zero, as in the case of the so-called "duty cycle" solenoid valve used in fuel injection system applications such as in U.S. Pat. Nos. 4,135,482 and 4,311,126, for example.

In order to enable the control port pressure to be varied in a true linear relationship to variations in "on time" of the solenoid coil, the valve member which controls the fluid connection of the control port to pressure supply or sump must be capable of rapid shifting movement in close synchronism with the energization and deenergization of the coil. Further, the valve member should also be movable in response to a relatively small magnetic force in order to minimize the size and power requirements of the solenoid.

Two problems have arisen with prior art solenoid actuated valves. First, because valve members, such as armatures, are moved at relatively numerous cycles per second and impact upon a portion of the valve housing or other armature stop for each cycle, performance and durability of the valve can be greatly reduced due to contact or impact stress caused by the recurring impact. Second, because valve members and valve bodies have relatively flat surfaces that contact each other with fluid therebetween, there may result in a vacuum lock being created between the two members which can prevent or interfere with the relative movement between the members and thereby interfere with the proper operation of the valve.

It is therefore an objective of the present invention to provide an improved fluid control valve that can overcome disadvantages in the prior art as well as provide other advantages.

SUMMARY OF THE INVENTION

The foregoing problems are overcome and other advantages are provided by an improved fluid control valve having at least one wave spring washer.

In accordance with one embodiment of the invention, a fluid pressure control valve is provided having a housing, an electromagnetic coil, a movable armature, an armature spring, a valve body and a wave spring washer. The armature is biased by the biasing spring in a first position and is movable to a second position when the electromagnetic coil is energized. The position of the armature controls fluid flow through the valve body. The wave spring washer is located between a portion of the housing and an end of the armature such that kinetic energy from movement of the armature can be relatively resiliently absorbed to reduce impact stress between the armature and housing.

In accordance with another embodiment of the present invention, a magnetically operated fluid control valve is provided comprising a housing, means for selectively conduiting fluid including a movable armature, means for moving the armature between first and second positions, and means for resiliently dampening impact between the armature and the housing including a wave spring washer located between a portion of the armature and a portion of the housing.

In accordance with another embodiment of the present invention, in a magnetically operated fluid control valve having a housing, an electromagnetic coil, and a magnetically movable armature, wherein the improvement comprises a wave spring washer located between a portion of the housing and a portion of the movable armature for dampening impact stress between the armature and the housing upon movement of the armature towards the housing portion with the wave spring washer being deformed therebetween, and for preventing a vacuum lock from being created between the housing and armature that would otherwise prevent the armature from moving.

In accordance with another embodiment of the present invention a magnetically operated fluid control valve is provided having a housing, means for selectively conduiting fluid including a valve body and a movable armature, and means for moving the armature between first and second positions. The means for moving includes an electromagnetic coil, an armature spring, and at least one wave spring washer located between a portion of the armature and a portion of the housing.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
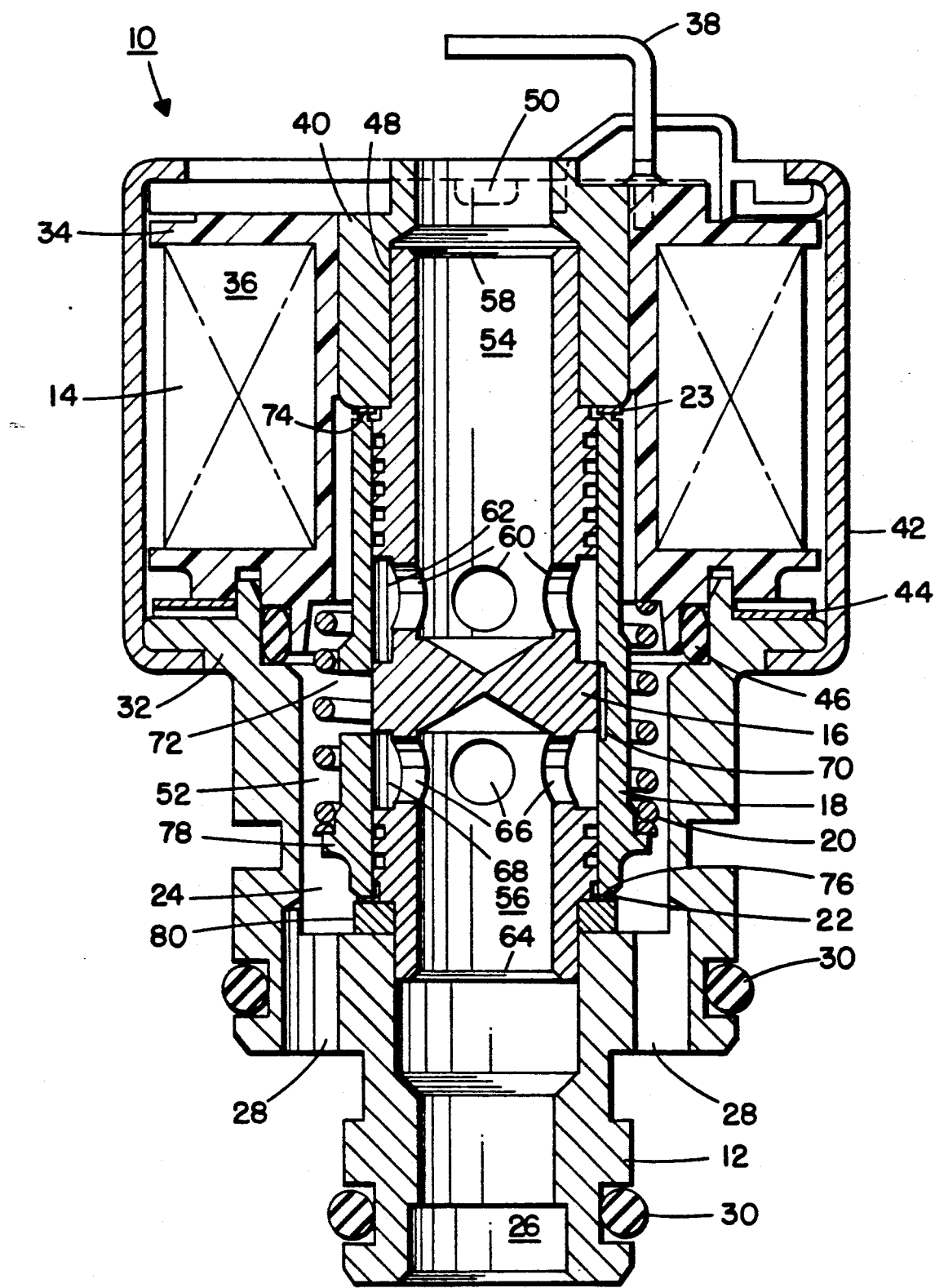
FIG. 1 is a schematic cross sectional view of an electromagnetically operated fluid control valve incorporating features of the present invention.

Referring to FIG. 1, there is shown a valve 10 incorporating features of the present invention. While the following description is with reference to the embodiment shown in the drawings, it should be understood that the present invention is capable of use in various forms, various types of use, and in various methods of use. In addition, any suitable size, shape, or type of elements can be used in a valve incorporating features of the present invention.

Figure 2:
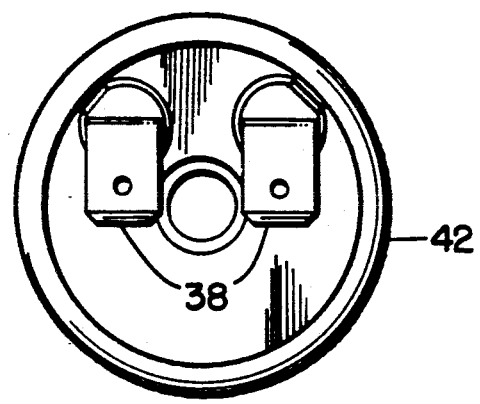
FIG. 2 is a plan top view of the valve shown in FIG. 1.

In the embodiment shown in FIG. 1, the valve 10 generally comprises a housing having a lower housing member 12 and an upper housing comprised of a bobbin and coil assembly 14. The valve 10 also has a valve body 16, a movable armature 18, an armature spring 20, and two wave spring washers 22 and 23 located in the housing. The lower housing 12 is generally formed of steel or some other ferromagnetic material. The lower housing member 12 generally comprises a center chamber 24 and two types of ports that communicate with the center chamber 24; a supply port 26 and control ports 28. When the valve 10 is suitably connected to a hydraulic system the supply port 26 is operably connected to a pressure supply source (not shown) which is operable to supply fluid under pressure to the valve 10. The control ports 28 are operably connected to a controlled device (not shown) to which fluid at a selected or regulated pressure is to be supplied via ports 28. The lower housing member 12 also comprises suitable seals 30, such as 0-rings, for sealing engagement of the valve 10 at ports 26 and 28 with the system. The lower housing member 12 also comprises an upper lip section 32 which is used to connect the lower housing member 12 with the bobbin and coil assembly 14. The bobbin and coil assembly 14 is generally comprised of a bobbin 34, an electromagnetic coil 36, two pole connectors 38 (see FIG. 2) and pole piece 40. The two pole connectors 38, as best seen in FIG. 2, extend up from the top of the valve 10 and are intended to be connected to an electronic processor control power source (not shown). The two pole connectors 38 are connected to opposite ends of the electromagnetic coil 36 to form a circuit such that electricity sent by the electronic processor controlled power source can enter the coil 36 via one of the pole connectors, travel through the coil 36, and exit the valve 10 via the second pole connector 38 with the coil 36 forming a magnetic field when energized. The coil 36 is suitably housed inside the bobbin 34. The pole shoe 40 is fixedly connected to the bobbin 34 and has a sump or exhaust port 50 which communicates with a center chamber 48 of the pole shoe. The exhaust port 50 can be suitably connected to a fluid sump which is preferably maintained at an atmospheric pressure, or at least a pressure lower than fluid pressure intended to enter the valve 10 via the supply port 26. The connection of the bobbin and coil assembly 14 to the lower housing member 12 generally comprises the bottom of the bobbin 34 sitting on top of the lower housing member upper lip section 32 with a wave spring 44 and seal 46 therebetween. An outer solenoid case 42 generally keeps the lower housing member 12 and bobbin and coil assembly 14 connected together in this arrangement with the wave spring 44 at least partially compressed therebetween.

The center chamber 24 of the lower housing member 12, the center chamber 35 of the bobbin 34, and the center chamber 48 of the hole piece 40 all combined to form a valve center chamber 52 which receives the valve body 16, movable armature 18, armature spring 20, wave spring washers 22 and 23 and an armature stop 80. The valve body 16 has a general column shape and is stationarily sandwiched between the armature stop 80 of the lower housing member 12 and the bobbin and coil assembly 14. In the embodiment shown, the valve body 16 generally comprises a first conduit 54 located in the upper portion of the valve body 16 and a second conduit 56 located in the lower portion of the valve body 16. The first conduit 54 has a first aperture 58 located at the fluid exhaust port 50 and a series of second apertures 60 located in a middle section of the valve body 16 with an outer circular depression 62 at the second apertures 60. The second conduit 56 has a third aperture 64 located at the fluid supply port 26 and a series of fourth apertures 66 located at a middle section of the valve body 16 with an outer circular depression 68 at the fourth apertures 66. In the embodiment shown, fluid from the supply port can substantially only gain access to the valve chamber 52 via the valve body second conduit 56. In a similar fashion, fluid can substantially only travel between the exhaust port 50 and the valve chamber 52 via the valve body first conduit 54. The movable armature 18 is generally comprised of a ferromagnetic material, such as steel, and has a general tubular shape. The interior of the armature 18 is suitably sized and shaped to be mounted over the valve body 16 in a substantially coaxial configuration. Located inside the armature 18 is a circular depression 70 having a hole 72 passing through the armature 18 from the interior of the armature 18 at the circular depression 70 to the exterior of the armature 18. In a preferred embodiment of the present invention, the distance between the bottom of the first conduit circular depression 62 and the top of the second conduit circular depression 68 is substantially equal to or slightly greater than the height of the armature circular depression 70. The armature 18 also generally comprises a top surface 74, a bottom surface 76 and a spring ledge 78. In the embodiment shown, the length of the armature 18 is smaller than the distance between the bottom of the pole piece 40 and the top of the armature stop 80 such that the armature 18 is axially movable on the valve body 16 as will be described below. Sandwiched between the top surface 74 of the armature 18 and the bottom surface of the pole piece 40 is the top wave spring washer 23. Sandwiched between the bottom surface 76 of the armature and armature stop 80 is the bottom wave spring washer 22.

Figure 3:
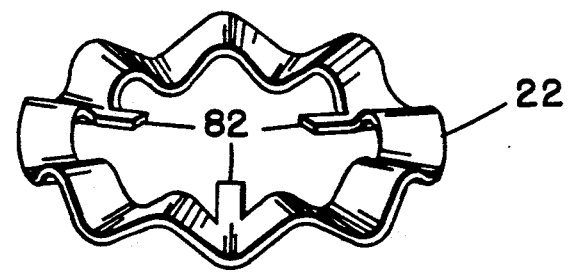
FIG. 3 is a perspective view of a wave spring washer used in the valve shown in FIG. 1.

The armature stop 80 is located on an interior surface of the lower housing member 12 in its center chamber 24 around the entrance of the supply port 26 into the center chamber 24. Referring also to FIG. 3, one embodiment of a wave spring washer is shown. The two wave spring washers 22 and 23, in the embodiment shown, are substantially identical and are generally provided as a resilient member to reduce contact stress caused by movement of the armature 18. In the embodiment shown, the washer 22 has a thickness of about 0.0025 inch and is comprised of stainless steel with 9 waves and a total height of about 0.0045 inch. However, any suitable type of wave spring washer can be provided. Located inside the center aperture of the washer 22 are tabs 82 which can be bent to clamp the washer 22 onto the ends of the armature 18. The washer 22 is generally intended to resiliently deform into a flat configuration when placed under a predetermined dynamic load. The use of wave spring washers at the ends of the armature 18 has two principle functions. First, use of the wave spring washers provides for a resilient stop of the armature 18 to thereby reduce contact stress between the armature 18 and the pole piece 40 and between the armature 18 and the armature stop 80. Second, due to the presence of fluids in the valve center chamber 52, the wave spring washers 22 and 23 substantially prevent a vacuum lock being created between the top surface 74 of the armature and the bottom surface of the pole piece 40, and between the bottom surface 76 of the armature and the top surface of the armature stop 80. Both of these features will be further described below.

The armature spring 20, in the embodiment shown, is generally provided as a coiled spring which surrounds a portion of the armature 18 and is compressed between a bottom surface of the bobbin 34 and the top surface of the armature spring ledge 78. In the configuration shown, the armature spring 20 generally provides the function of biasing the armature 18 in a downward position while the coil 36 is deenergized. The armature spring 20 is sufficiently strong to cause the armature 18 to flatten the bottom wave spring washer 22 while the coil 36 is deenergized. Also in this deenergized configuration, the second conduit circular depression 68 communicates with the armature interior circular depression 70 and hole 72 such that pressurized fluid entering the supply port 26 can travel through the second conduit 56 and through hole 72 into the valve center chamber 52 and exit the valve 10 via control ports 28. As described above, the height of the interior armature circular depression 70 is substantially the same or slightly smaller than the distance between the two valve body circular depressions 62 and 68. Thus, with the coil 36 deenergized and armature spring 20 biasing the armature in a downward position, the armature 18 substantially blocks off the first circular depression 62 from the valve center chamber 52 to prevent fluid from exiting the exit port 50 in the deenergized state of the valve 10. In the deenergized state, the top wave spring washer 23 would have a non-flat configuration as shown in FIG. 3.

Upon energizing the coil 36 electromagnetic forces attract the armature 18 in an upward direction. The electromagnetic force is sufficiently strong to overcome the spring force of the armature spring 20 and the spring force of the top wave spring washer 23 to cause the armature 18 to move upward and substantially flatten the top wave spring washer 23 between the top surface 74 of the armature and the bottom surface of the pole piece 40. The bottom wave spring washer 22 unflattens as the armature 18 moves upward and also slightly assists in the upward movement of the armature. As the armature moves upward, the interior armature circular depression 70 and hole 72 move upward and out of communication with the valve body second conduit circular depression 68 thereby preventing flow of the pressurized fluid from the supply port 26 into the valve center chamber 52. In the energized state of the coil 36, with the armature 18 in an upward position, the interior armature center depressions 70 and hole 72 now communicate with the first conduit central depression 62 such that the exit port 50 communicates with the valve center chamber 52 and control ports 28. Upon deenergizing the coil 36 the armature spring 20 biases the armature 18 back towards its downward position, once again closing communication between the first conduit 52 and the valve center chamber 52 and opening the communication between the second conduit 56 and the valve center chamber 52. The top wave spring washer 23 aids this downward movement of the armature 18, at least partially, and resumes its unflattened configuration. The bottom wave spring washer 22, on the other hand, is once again flattened by the bottom surface 76 of the armature 18 due to the force being applied by the armature spring 20 and top wave spring washer 23.

The valve 10 described above is generally intended to be used as an interface between electrical and hydraulic portions of a motor vehicle automatic transmission for regulating the engagement pressure applied to various clutches in the transmission. However, obviously the valve can be used with any suitable hydraulic system that requires rapid and precise conversion of sensed operating conditions to suitable fluid pressures. Although solenoid actuated valves have been used for this purpose in the past, as described above, two main problems have plagued these types of valves in the past. First, because of rapid and repeated energizing and deenergizing of valves, sometimes in the order of 70 times a second, durability of the pieces of the valves is a problem. The repeated and rapid impact of a solenoid armature on the valve housing without some type of dampening effect will result in eventual ware and failure due to impact stress. The second main problem that has plagued prior valves is that due to the smooth flat surfaces of the movable armatures and valve housing at the contact points of the armatures with the housings, and because a small film of fluid is caught between these members, a vacuum lock can be created between the armatures and the housing. This type of vacuum lock created by a small film between two smooth flat surfaces is extremely difficult to break by attempting to pull the members apart. Thus, the members can stick together which results in failure of the valve or at least an increased delay in time for the valve to change flow directions. The present invention solves these problems as well as providing other advantages.

By the use of the wave spring washers 22 and 23 at the impact areas of the ends 74 and 76 of the armature 18 a resilient stop is provided rather than a stiff stop. The resilient stop action absorbs the same amount of kinetic energy as the stiff stop, but the maximum force level is considerably less for the resilient stop action, the contact stress is much less and thus durability of the valve prices is improved. The use of wave spring washers also allows for the use of fluid squeeze flow damping to dampen impact and reduce contact stress. In addition, ECM pads can be eliminated by the use of the wave spring washers with the waves of the washers performing the same fluid venting for cold performance that the slots between pads do on current ECM armatures. The present invention also allows the use of a full ring armature. Because of increased flux transmitting area that can be provided with the use of a full ring armature, performance of the valve incorporating features of the present invention can be improved and more than offsets the increased air gaps created by the wave spring washers.

In addition to the increased durability and performance noted above, the present invention prevents a vacuum lock from being created, or at least quickly breaks the vacuum lock if created. Although a vacuum lock is very difficult to break by attempting to pull the locked members apart, it is relatively simple and easy to break the vacuum lock by pushing the members apart. Thus, the wave spring washers, by their pushing on the ends of the armature, can substantially prevent or at least quickly break a vacuum lock at the ends of the armature. Thus, performance and reliability is enhanced.

With a valve incorporating features of the present invention the overall performance of the valve is increased. The time it takes for the armature to travel its predetermined travel distance is decreased. The velocity of the armature at final impact is decreased. The kinetic energy that needs to be absorbed at final impact is decreased. Thus, performance and durability are increased. In addition, the present invention can allow for stronger and larger armature springs and electromagnetic coils to increase the velocity of armature without a significant decrease in durability. The present invention also takes advantage of squeeze flow damping to increase durability of the valve. In addition, because ECM pads are no longer needed when using wave spring washers, manufacturability of the present invention is also improved.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A fluid pressure control valve comprising:
   a housing having a chamber therein with a fluid supply port, a fluid control port, and a fluid exhaust port communicating with said chamber;
   an electromagnetic coil coaxially mounted in said housing relative to said chamber;
   a movable armature located in said chamber having a first end, a second end, a center channel between said two ends and a side aperture into said center channel,
   an armature spring biasing said armature in a first position in said chamber;
   a valve body located, at least partially, in said armature center channel, said valve body having a first conduit with a first aperture at said fluid exhaust port and a second aperture communicatable with said armature side aperture, and a second conduit with a third aperture at said fluid supply port and a fourth aperture communicatable with said armature side aperture, said armature being movable from said first position to a second position upon energizing of said coil, said second aperture communicating with said armature side aperture and said fluid control port in said second position and said fourth aperture communicating with said armature side aperture and said fluid control port in said first position; and
   two wave spring washers, each of said washers being located between a portion of said housing and an opposite end of said armature such that kinetic energy from movement of said armature between said first and second positions can be relatively resiliently absorbed by said washers to reduce impact stress between said armature and said housing.

2. A valve as in claim 1 wherein said housing comprises a solenoid sleeve, a coil bobbin and a pole piece.

3. A valve as in claim 1 wherein said coil is connected to two connecting poles extending from said housing.

4. A valve as in claim 1 wherein said valve body is relatively stationarily held in said housing chamber.

5. A valve as in claim 1 wherein said first spring washer has about 9 waves with a spring rate of about 971 pounds per inch.

6. A magnetically operated fluid control valve comprising:
   a housing having a chamber therein with a fluid supply port, a fluid control port, and a fluid exhaust port;
   means for selectively conduiting fluid including a movable armature located in said housing chamber movable between a first position and a second position, said first position allowing fluid to be conduited between said fluid supply port and said fluid control port, said second position allowing fluid to be conduited between said fluid control port and said fluid exhaust port;
   means for moving said armature between said first and second positions including an electromagnetic coil connected to said housing and, an armature spring for biasing said armature in said first position; and
   means for resiliently dampening impact between said armature and said housing upon movement of said armature between said first and second positions including a wave spring washer located between a portion of said armature and a portion of said housing.

7. A valve as in claim 6 wherein said means for selectively conduiting fluid includes a valve body stationarily held in said housing chamber with a first conduit and a second conduit therethrough.

8. A valve as in claim 7 wherein said armature has a general tube shape and said body has a general column shape, said armature being coaxially mounted over said valve body and being movably thereon.

9. A valve as in claim 6 wherein said wave spring washer can, at least partially, aid in moving said armature to prevent said armature and said housing becoming vacuum locked together.

10. A valve as in claim 6 wherein said means for resiliently dampening impact includes two wave spring washers at opposite ends of said armature.

11. In a magnetically operated fluid control valve having a housing with a fluid supply port, a fluid control port, a fluid exhaust port and a central chamber, an electromagnetic coil, and a magnetically movable armature for controlling fluid flow between said ports, wherein the improvement comprises:
   two wave spring washers, each washer being located between a portion of said housing and a portion of said movable armature for dampening impact stress between said armature and said housing upon movement of said armature relative to said housing with said wave spring washers being alternatingly deformed therebetween, and for preventing a vacuum lock from being created between said housing and said armature that would otherwise interfere with movement of said armature.

12. A valve as in claim 11 wherein the improvement comprises a relative strong armature biasing spring with a relatively high spring rate such that said armature can be moved at a relatively fast speed between first and second positions without decreasing durability of the armature including during repeated cycles of movement between said first and second positions such as about 70 times per second.

13. A valve as in claim 11 wherein said washers provide gaps between portions of said washers and said housing and armature to prevent vacuum lock.

14. A magnetically operated fluid control valve comprising:
   a housing having a chamber therein with a fluid supply port, a fluid control port, and a fluid exhaust port;
   means for selectively conduiting fluid including a stationary valve body and a movable armature located in said housing chamber, said armature being movable between a first position and a second position, said first position allowing fluid to be conduited between said fluid supply port and said fluid control port, said second position allowing fluid to be conduited between said fluid control port and said fluid exhaust port; and
   means for moving said armature between said first and second positions including an electromagnetic coil connected to said housing, an armature spring for biasing said armature in said first position, and at least one wave spring washer located between a portion of said armature and a portion of said housing for preventing a vacuum lock between said armature and said housing.

15. A valve as in claim 14 wherein said armature is comprised of a substantially intact tube with a center channel and having a hole passing through a middle section thereof.

16. A valve as in claim 14 wherein said valve body has two conduits passing therethrough from opposite ends of said body to a middle section thereof.

* * * * *